United States Patent
Krause et al.

(10) Patent No.: US 11,481,552 B2
(45) Date of Patent: Oct. 25, 2022

(54) GENERATIVE-DISCRIMINATIVE LANGUAGE MODELING FOR CONTROLLABLE TEXT GENERATION

(71) Applicant: salesforce.com, inc., San Francisco, CA (US)

(72) Inventors: Ben Krause, Palo Alto, CA (US); Akhilesh Deepak Gotmare, Singapore (SG)

(73) Assignee: Salesforce.com, Inc., San Francisco, CA (US)

( * ) Notice: Subject to any disclaimer, the term of this patent is extended or adjusted under 35 U.S.C. 154(b) by 229 days.

(21) Appl. No.: 17/011,939

(22) Filed: Sep. 3, 2020

(65) Prior Publication Data
US 2021/0374341 A1 Dec. 2, 2021

Related U.S. Application Data

(60) Provisional application No. 63/033,002, filed on Jun. 1, 2020.

(51) Int. Cl.
*G06F 40/274* (2020.01)
*G06F 40/284* (2020.01)
(Continued)

(52) U.S. Cl.
CPC .......... *G06F 40/274* (2020.01); *G06F 40/216* (2020.01); *G06F 40/284* (2020.01)

(58) Field of Classification Search
CPC ..... G06F 40/274; G06F 40/284; G10L 15/18; G10L 15/183
(Continued)

(56) References Cited

U.S. PATENT DOCUMENTS 8,812,299 B1 * 8/2014 Su .......................... G06F 40/30 704/9
9,292,487 B1 * 3/2016 Weber ................... G10L 15/187
(Continued)

OTHER PUBLICATIONS

Krause et al., "GEDI: Generative Discriminator Guided Sequence Generation", arXiv pre-print, 30 pages, Oct. 22, 2020 (Year: 2020).*
(Continued)

*Primary Examiner* — Martin Lerner
(74) *Attorney, Agent, or Firm* — Haynes and Boone, LLP

(57) ABSTRACT

The embodiments describe a generative-discriminative (GeDi) language modeling for determining a next token in a text sequence. A class conditional language model and a positive control code determine a first class conditional probability for each token candidate. The class conditional language model and a negative control code determine a second class conditional probability for the each token candidate. A logarithmic probability difference between the first class conditional probability and the second class conditional probability is determined for each token candidate. An unconditional language model determines an unconditional probability for each token candidate. A combined probability is determined by combining the unconditional probability and the logarithmic probability difference for each token candidate. The next token is selected from the token candidates based on the combined probabilities of the token candidates.

20 Claims, 4 Drawing Sheets

(51) Int. Cl.
*G10L 15/183* (2013.01)
*G06F 40/216* (2020.01)

(58) Field of Classification Search
USPC .................. 704/1, 9, 10, 243, 255, 257
See application file for complete search history.

(56) References Cited

U.S. PATENT DOCUMENTS

| | | | | |
|---|---|---|---|---|
| 2008/0215311 A1* | 9/2008 | Chelba | .................. | G06F 40/216 704/9 |
| 2009/0055184 A1* | 2/2009 | Hebert | .................. | G06F 40/205 704/257 |
| 2015/0095017 A1* | 4/2015 | Mnih | .................... | G06F 40/284 704/9 |
| 2016/0062985 A1* | 3/2016 | Epstein | ................ | G06F 40/289 704/9 |
| 2016/0092434 A1* | 3/2016 | Bellegarda | ............. | G06F 40/35 704/9 |
| 2016/0283851 A1* | 9/2016 | Bute | ..................... | G06F 40/284 |
| 2018/0300311 A1* | 10/2018 | Krishnamurthy | ....... | G06F 40/30 |
| 2020/0211537 A1* | 7/2020 | Scheiner | ............... | G06F 40/289 |

OTHER PUBLICATIONS

Keskar, et al., "CTRL: A Conditional Transformer Language Model for Controllable Generation," arXiv preprint arXiv:1909.05858, Sep. 20, 2019, 18 pages.

Ng et al., "On Discriminative vs. Generative classifiers: A comparison of logistic regression and naive Bayes," In Advances in neural information processing systems, 2002, 8 pages.

Yogatama et al., "Generative and discriminative text classification with recurrent neural networks," arXiv preprint arXiv:1703.01898, May 26, 2017, 9 pages.

Yakhnenko et al., "Discriminatively trained markov model for sequence classification," In Fifth IEEE International Conference on Data Mining (ICDM'05), 2005, IEEE, 8 pages.

Lasserre et al., "Principled hybrids of generative and discriminative models," In 2006 IEEE Computer Society Conference on Computer Vision and Pattern Recognition (CVPR'06), vol. 1, 2006, IEEE, 8 pages.

Ficler et al., "Controlling linguistic style aspects in neural language generation," arXiv preprint arXiv:1707.02633, Jul. 9, 2017, 14 pages.

Yu et al., "SeqGAN: Sequence Generative Adversarial Nets with Policy Gradient," In Thirty-First AAAI Conference on Artificial Intelligence, Aug. 25, 2017, 11 pages.

Hu et al., "Toward controlled generation of text," In ICML, Jul. 11, 2017, 10 pages.

Zhang et al., "Generating text via adversarial training", NIPS 2016, 6 pages.

Ziegler et al., "Fine-tuning language models from human preferences," arXiv preprint arXiv:1909.08593, Jan. 8, 2020, 26 pages.

Dathathri et al., "Plug and play language models: a simple approach to controlled text generation," ICLR, Mar. 3, 2020, 34 pages.

Radford et al., "Language models are unsupervised multitask learners," OpenAI Blog, 1(8):9, 2019, 24 pages.

Goodfellow et al., "Generative adversarial nets," In Advances in neural information processing systems, pp. 2672-2680, Jun. 10, 2014, 9 pages.

Clark et al., "ELECTRA: Pre-training Text Encoders as Discriminators Rather Than Generators," arXiv preprint arXiv:2003.10555, Mar. 23, 2020, 18 pages.

Li et al., "Delete, retrieve, generate: A simple approach to sentiment and style transfer," In NAACL-HLT, Apr. 17, 2018, 12 pages.

Sudhakar et al., "Transforming delete, retrieve, generate approach for controlled text style transfer," In EMNLP/IJCNLP, Nov. 3-7, 2019, 11 pages.

Melnyk et al., "Improved neural text attribute transfer with non-parallel data," ArXiv, abs/1711.09395, Dec. 4, 2017, 6 pages.

Bowman et al., "Generating sentences from a continuous space," In 20th SIGNLL Conference of Computational Natural Language Learning, Aug. 7-12, 2016, 12 pages.

* cited by examiner

| Type of training | label fidelity | L.A. |
|---|---|---|
| Generative | 75.3% | 3.21 |
| GeDi ($\lambda = 0.75$) | 81.8% | 3.24 |
| GeDi ($\lambda = 0.5$) | 80.0% | 3.17 |
| GeDi ($\lambda = 0.25$) | 80.0% | 3.25 |
| GeDi ($\lambda = 0.05$) | 79.0% | 3.11 |

Table 1: MNLI human evaluation experiments. Label fidelity and linguistic acceptability (L.A) for human evaluation of samples from generative vs. GeDi training (where $\lambda = 1$ is equivalent to generative).

*FIG. 4*

GENERATIVE-DISCRIMINATIVE LANGUAGE MODELING FOR CONTROLLABLE TEXT GENERATION

PRIORITY DATA

This application claims priority to U.S. Provisional Application No. 63/033,002 filed on Jun. 1, 2020 and entitled "Controllable Language Generation Using Hybrid Generative Discriminative Training," which is incorporated by reference in its entirety.

TECHNICAL FIELD

The embodiments are generally directed to language models and more specifically to determining a next token in a text sequence using a generative-discriminative language model.

BACKGROUND

Applications use language models (LMs) to perform language tasks. These tasks include summarizing text, translating text into another language, and generating a question or answer in a dialogue with a human user. Many text generation algorithms train LMs to simply maximize the log-likelihood of training data. While log-likelihood trained LMs successfully model the density of real data, the LMs may also assign high densities to unrealistic text.

For example, conditional language generation approaches, such as conditional transformation language (CTRL), train LMs to condition on attribute labels that relate to the style or features of the text with the goal of generating text in a specific class. However, the text generated by the LMs trained using the CTRL approach may not correspond to the class of the attribute label that was used to condition the LMs.

For example, CTRL may be trained to generate sentiment on reviews, i.e. Amazon reviews, and may be effective at generating positive and negative reviews corresponding a given control code. However, if the CTRL is used to control the sentiment or tone of text in a book, the LMs may struggle to achieve high label fidelity and may revert back to generating sentiment reviews. Because sentiment reviews generally follow the sentiment control codes during training, the LMs may predicts the next word tokens that relate to sentiment reviews, even though the prompt is a text of the book.

BRIEF DESCRIPTION OF THE DRAWINGS

FIG. 4 is a diagram of the results obtained with the generative-discriminating language modeling technique and a conventional generative language modeling technique.

In the figures and appendix, elements having the same designations have the same or similar functions.

DETAILED DESCRIPTION

The embodiments disclose a generative-discriminative (GeDi) language modeling technique for determining a next token in a text sequence. In the GeDi language modeling, class conditional language models (LMs) generate natural language with specific attributes, such as style or sentiment, by conditioning on an attribute label, or "control code". The class conditional LMs are effective for generating text that resembles the training domains corresponding to the control codes, but have limited ability to generalize attributes to new domains, or generalize to new control codes.

In some embodiments, to extend the capabilities of class-conditional LMs, GeDi language modeling uses class conditional LMs as generative classifiers to guide generation from an unconditional LM towards a desired attribute. In particular, the GeDi LM, which may be a trained class conditional LM, may determine a next token in a text sequence by determining class conditional probabilities for the token candidates using a positive control code and a negative control code. The logarithmic difference between the positive class conditional probability and negative conditional probability for each token candidate may be combined with the output of an unconditional LM to determine the next token in the sequence.

The embodiments are also directed to training GeDi LMs. The GeDi technique trains the class conditional LM using both generative and discriminative classification loss which results in in class-conditioned LMs that generate samples more strongly in one class rather than other classes. The class conditional LMs trained using the GeDi training technique generate class conditional text with a higher label fidelity while preserving the same level of linguistic acceptability as in conventional training techniques.

In some embodiments, the GeDi training technique combines the normal log-likelihood loss (generative loss) and discriminative loss. The log-likelihood loss may be used to train LMs. The discriminative loss encourages a conditional LM to assign, for a given control code, a higher likelihood to text corresponding to that control code and a lower likelihood to text corresponding to other control codes.

As used herein, the terms "network" and "model" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Figure 1:
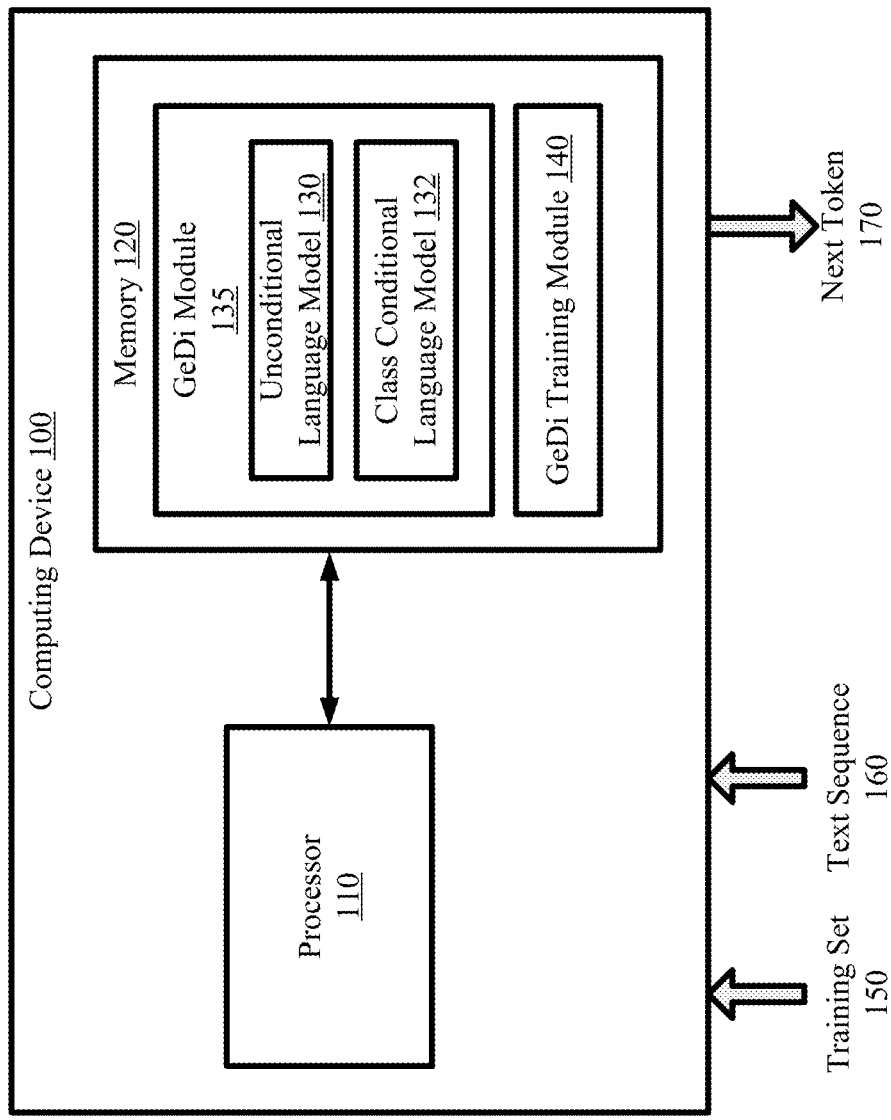
FIG. 1 is a simplified diagram of a computing device for generating a next token in a text sequence with generative-discriminative language modeling, according to some embodiments.

FIG. 1 is a simplified diagram of a computing device 100 for determining a next token in a text sequence using the generative-discriminative language modeling, according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for an unconditional language model (LM) 130 and class-conditional language models 132 as part of a generative discriminative (GeDi) module 135, and generative-discriminative training module 140 (GeDi training module 140). Unconditional LM 130 and class conditional LM 132 may include neural networks or a combination of neural networks and are typically trained to perform a particular task. The LM 130 and class conditional LM 132 may receive a text sequence 160. Text sequence 160 may be a sentence, a question, etc. In response, LM 130, class conditional LM 132, and/or GeDi module 135 may generate a next token 170 in the text sequence 160. GeDi training module 140 may train class conditional LM 132 using training set 150. Training set 150 may include multiple text sequences where each word in a sequence has a corresponding control code.

In some embodiments, language models, such as unconditional LM 130 rely on an auto-regressive factorization to estimate density estimation and generate language data. Auto-regressive sequence LM 130 may assign a probability to a text sequence $x_{1:T} = \{x_1, \ldots, x_T\}$ by factorizing the sequence using the chain rule as, as shown below:

$$p_\theta(x_{1:T}) = \Pi_{t=1}^T p_\theta(x_t | x_{<t}) \quad \text{Equation 1}$$

where $x_t$ in $\{x_1, \ldots, x_T\}$ is a word or a token. The LM 130 may assign probabilities to sequences by iteratively predicting a distribution over the next token 170 given the previous tokens in the text sequence. To generate a probability for the current token $x_t$, LM 130 may iteratively sample from $p_\theta(x_t|x_{<t})$, and then feed $x_t$ back into the LM 130 as input for the next step that determines $x_{t+1}$.

In some embodiments, a language model may be class conditional LM 132. Class conditional LM 132, such as a class conditional transformer model (CTRL), may generate the token $x_t$ while being conditioned on an attribute variable or a control code. The class conditional LM 132 may predict a probability distribution $p_\theta(x_{1:T}|c)$, where c is a class variable or a "control code" that describes an attribute of the text in $x_{1:T}$. In some embodiments, the control code may describe a sentiment or a topic, such as "World/Politics," "Sports," "Business," and "Science/Technology." The autoregressive regressive factorization for a class conditional LM 132 may be determined using the equation below:

$$p_\theta(x_{1:T}|c) = \Pi_{t=1}^T p_\theta(x_t|x_{<t},c) \quad \text{Equation 2}$$

As discussed above, prior to class conditional LM 132 determining the next word $x_t$ in the text sequence, class conditional LM 132 may be trained using training set 150. Training set 150 may be defined as a set of text sequences $\{x_{1:T}^{(1)}, \ldots, x_{1:T}^{(i)}, \ldots, x_{1:T}^{(N)}\}$. Each sequence $x_{1:T}^{(i)}$ in the training set 150 may be paired with a control code $c^{(i)}$, which is a label or category of the sequence. Class conditional LM 132 may be trained to minimize average loss $-\log P(x_{1:T}|c)$ which is referred to as a generative loss $\mathcal{L}_g$. Generative loss $\mathcal{L}_g$ may be defined as:

$$\mathcal{L}_g = -\frac{1}{N}\sum_{i=1}^N \frac{1}{T}\sum_{t=1}^T \log P(x_t^{(i)} | x_{<t}^{(i)}, c^i) \quad \text{Equation 3}$$

In some embodiments, generative language modeling may further improve the class conditional LM 132. In generative language modeling, class conditional LM 132 may discriminatively guide generation from an unconditional LM, such as LM 130. Further, in generative language modeling, class conditional LM 132 may be trained to better classify tokens for guide generation. The generative language modeling may be included in GeDi module 135. GeDi module 135 assumes there is a desired or positive control code c and an undesired or negative control code $\bar{c}$ associated with token $x_t$. A control code may be an attribute that is used to condition the class conditional LM 132. In particular, class conditional LM 132 may generate text corresponding to a desired (or positive) control code. The class conditional LM 132 should not generate text that corresponds to an undesired (or negative) control code. Notably, any control code may be categorized into a desired or undesired control code, and class conditional LM 132 may be trained to generate text corresponding to the desired control code or not generate text according to the undesired control code. In this case, class conditional LM 132 may determine positive class conditional probability $P_\theta(x_{1:T}|c)$ and negative class conditional probability $P_\theta(x_{1:T}|\bar{c})$, and use the contrast between $P_\theta(x_{1:T}|c)$ and $P_\theta(x_{1:T}|\bar{c})$ to guide the sampling from an unconditional LM 130 that determines $P_{LM}(x_{1:T})$. For example, when predicting the next token $x_t$ (next token 170), GeDi module 135 may use a difference between the positive and negative class conditional log probabilities as a signal to steer the unconditional LM 130 toward generating a sequence in the correct class. In some embodiments, the difference between the positive and negative class conditional probabilities may be defined as below:

$$\Delta \log P_\theta(x_t | x_{<t}, c), = \log \frac{P_\theta(x_t | x_{<t}, c)}{P_\theta(x_t | x_{<t}, \bar{c})} \quad \text{Equation 4}$$

For example, suppose a control code c is trained on positive movie reviews and the undesired control code $\bar{c}$ is trained on negative movie reviews. Since control codes c and $\bar{c}$ are biased toward movie reviews, the direct class-conditional sampling by class conditioned LM 132, such as CTRL, may result in the next word prediction that is a movie review that includes both positive and negative sentiment. However, due to the difference in next word predictions given by the class conditional log probability $\Delta \log P_\theta(x_t|x_{<t}, c)$, words pertaining to movie reviews should be canceled out. Further, the words with the highest $\Delta \log P_\theta(x_t|x_{<t}, c)$ may be associated with positive sentiment. The highest $\Delta \log P_\theta(x_t|x_{<t}, c)$ may then be used to guide an unconditional LM 130 toward a generating positive sentiment across different domains. For example, in one embodiment, the LM 130 may be guided using $\Delta \log P_\theta(x_t|x_{<t}, c)$ to create a weighted posterior over the class conditional next word prediction. In another embodiment, the LM 130 may be guided by filtering out the next word predictions using a lower $\Delta \log P_\theta(x_t|x_{<t}, c)$.

In some embodiments, class conditional LM 132, such as CTRL, may be used as a generative classifier by applying, e.g. Bayes rule as follows:

$$P_\theta(c|x_{1:T}) = \frac{P(c)P_\theta(x_{1:T}|c)}{\sum_{c'} P(c')P_\theta(x_{1:T}|c')} \quad \text{Equation 5}$$

where in the binary case $c' \in \{c, \bar{c}\}$. The Bayes rule may determine a probability of an event based on the prior knowledge conditions that may be related to the event. When the equation 5 is applied to partial sequences of length t, taking the log, and assuming equal class distributions, Equation 5 may be defined as follows:

$$P_\theta(c|x_t, x_{<t}) = \sigma(\Sigma_{j=1}^t \Delta \log P_\theta(x_j|x_{<j}, c)) \quad \text{Equation 6}$$

where $\sigma$ is the sigmoid function. When computing Equation 6 during the text sequence generation (i.e. predicting the next word in the sequence) and using an autoregressive left to right LM 132, the $\Delta \log P_\theta(x_j|x_{<j}, c)$ for any $j<t$ has already been computed from the previous steps. In this case, only $\Delta \log P_\theta(x_t|x_{<t}, c)$ may be computed at the current step that determines the next word $x_t$. Further, when GeDi module 135 determines a guide signal using class conditional LM 132, the log probabilities may be divided by the current text sequence length t which may result in a more stable guide generation of potentially longer and variable length sequences. In some embodiments, when using a GeDi module 135, the log probabilities may be multiplied by a learned scale parameter $\alpha$, which is described below in Equation 10.

In some embodiments, using Equation 6 above, $P_\theta(c|x_t, x_{<t})$ may be efficiently computed during generation for every possible next token $x_t$. This is unlike conventional systems that apply a normal uni-directional classifier LM, such as GPT, to compute $P_\theta(c|x_t, x_{<t})$ directly and may require feeding every possible $x_t \in V$ into the classifier. This results in $|V|$ number of forward passes for a vocabulary set V. This is also unlike bi-directional classifier LM that use a BERT classifier to compute $P_\theta(c|x_t, x_{<t})$ and may use $t \times |V|$ forward passes because attention states from earlier time steps would be recomputed. In the embodiments, using a generative classifier in GeDi module 135, $P_\theta(c|x_t, x_{<t})$ may be computed in two parallel forward passes, where one pass may compute positive class conditional probability $P_\theta(x_t|x_{<t}, c)$ and another compute negative class conditional log probability $P_\theta(x_t|x_{<t}, \bar{c})$.

When $P_\theta(c|x_t, x_{<t})$ is estimated, the weight posterior heuristic or filtering heuristic may guide generation of the next word $x_t$. In one embodiment, a weight posterior may be applied as follows:

$$P_w(x_t|x_{<t}, c) \propto P_{LM}(x_t|x_{<t}) P_\theta(c|x_t, x_{<t})^\gamma \quad \text{Equation 7}$$

where $\gamma > 1$ may be used to bias the generation signal more strongly toward the correct class and $P_{LM}(x_t|x_{<t})$ is the probability generated by LM 130. In this case, the right side of Equation 7 may be normalized over all $x_t$ in the vocabulary V to obtain $P_w(x_t|x_{<t}, c)$. After the right side of the equation is normalized, the sum of probabilities for all $x_t$ is equal to one. The $P_w(x_t|x_{<t}, c)$ is a probability of each token candidate being the next token $x_t$.

In another embodiment, a filtering heuristic may be applied. The filtering heuristic may be similar to nucleus sampling and may remove candidate network tokens with lower values for $\Delta \log P_\theta(x_t|x_{<t}, c)$, while maintaining a minimum of at least p word candidates in cumulative probability mass in $p_w(x_t|x_{<t}, c)$. In some embodiments, set of tokens $V_n \subseteq V$ may be defined for a given integer $n \in [1, |V|]$ as the set of n words that maximizes $\Sigma_{x_t \in V_n} p(c|x_t, x_{<t})$. The n words may be words with the highest $p(c|x_t, x_{<t})$. Further, m may be defined as a minimum number of n words such that:

$$\Sigma_{x_t \in V} p_w(x_t|x_{<t}, c) \geq \rho \quad \text{Equation 8}$$

Further, $V_m$ may be defined as $V_n$ for n=m. In this case, $V_m$ may contain the minimum number of tokens possible given the constraints for $V_n$ to maintain a minimum cumulative probability of $\rho$.

A set of tokens $V_p \subseteq V$ may also be defined. The set of tokens $V_p$ includes tokens that are kept as potential word candidates for $x_t$. The kept tokens may be all tokens where $p(c|x_t, x_{<t}) > \tau$, where $\tau$ is a configurable threshold. This means that tokens in $V_p$ have reasonable certainty of being a correct prediction for the $x_t$ and there may not be a need for more filtering. The final set of tokens $V_k$ may be $V_k = V_p \cup V_m$. In some embodiments, the probabilities of tokens that are not in $V_k$ may be set to zero, and the remaining distribution may be rescaled to equal to one.

Figure 2:
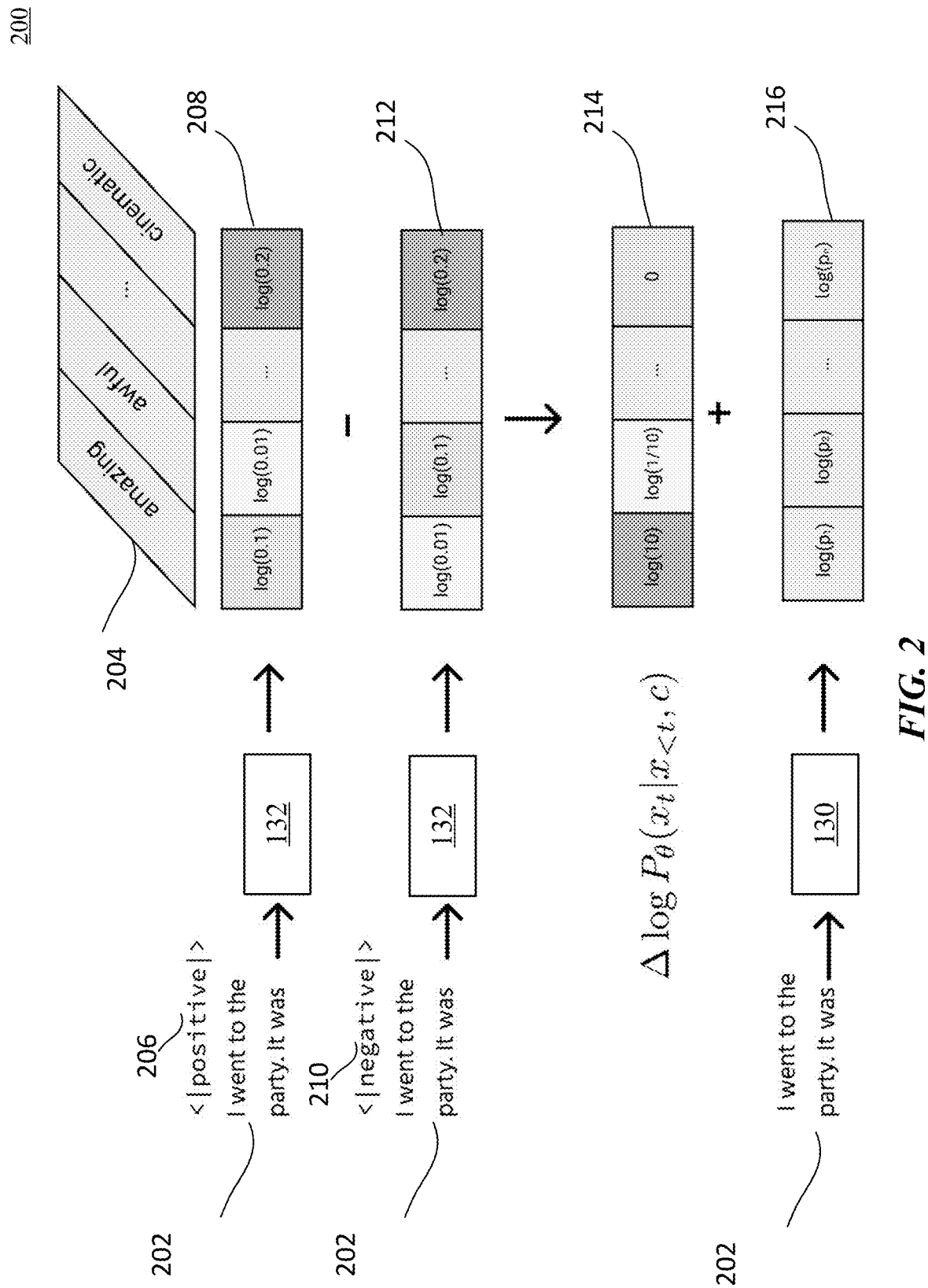
FIG. 2 is a diagram showing generative-discriminative language modeling determining the next token in a text sequence, according to some embodiments.

FIG. 2 is a diagram 200 illustrating generative-discriminative language modeling, according to an embodiment. FIG. 200 includes a text sequence "I went to the party. It was". The text sequence is labeled text sequence 202. FIG. 200 also illustrates a set of token candidates 204 for the next token ($x_t$) to be included in text sequence 202. The example token candidates shown in FIG. 2 are "amazing," "awful," and "cinematic." To determine the next token, FIG. 2 uses GeDi module 135 with class conditional LM 132 and unconditional LM 130. Class conditional LM 132 used in FIG. 2 is trained for a sentiment on movie reviews, and as such class conditional LM 132 may be biased toward predicting movie review words, such as "cinematic."

As discussed above, in GeDi module 135, class conditional LM 132 may use a positive control code 206 to compute positive class conditional probability $P_\theta(x_{1:T}|c)$ and determine a logarithm of the computed class conditional probability 208. Class conditional LM 132 may also use a negative control code 210 to compute negative class conditional probability $P_\theta(x_{1:T}|\bar{c})$ and determine a logarithm of the computed class conditional probability 212. Because class conditional LM 132 is biased toward movie review words, the word "cinematic" has the highest logarithm of the class conditional probabilities 208 and 212. Notably, both class conditional probabilities $P_\theta(x_{1:T}|c)$ and $P_\theta(x_{1:T}|\bar{c})$ may be computed by performing a single forward pass through class conditional LM 132. The two forward passes may be performed in parallel.

As illustrated in FIG. 2, the bias in class conditional LM 132 may be cancelled out by determining the difference $\Delta \log P_\theta(x_t|x_{<t}, c)$ in the logarithms of the class conditional probabilities 208 and 212. The logarithmic difference is labeled 214 and may be determined as shown in Equation 4. Specifically, the logarithmic difference 214 for word "cinematic" is zero which eliminates the bias of the class conditional LM 132. On the other hand, the logarithmic difference 214 for the word "amazing" is magnified to ten.

FIG. 2 also illustrates that GeDi modeling uses the logarithmic difference 214 as a classifier to guide generation of the next token $x_t$ by the unconditional LM 130, such as GPT-2. The unconditional LM 130 also receives the text sequence 202 and generates an unconditional probability $P_{LM}(x_t|x_{<t})$. The unconditional probability is labeled 216. According to the embodiments of the disclosure, the logarithm of the unconditional probability 216 may be combined with the logarithmic difference 214 using the posterior or filtering heuristics (not shown). Using the heuristic, the combination causes LM 130 to determine the next token 170 (i.e. word) in text sequence 202.

Figure 3:
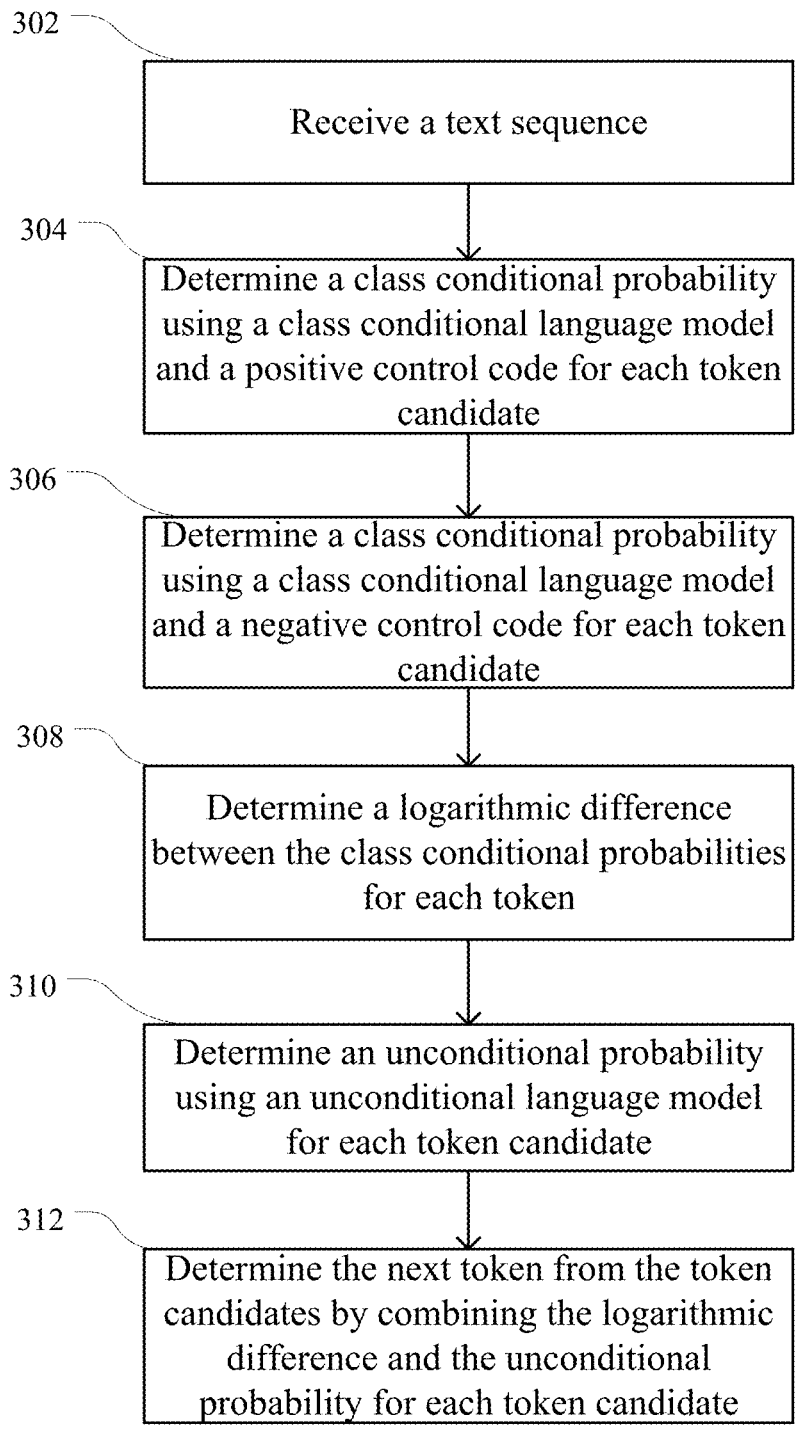
FIG. 3 is a flowchart of a method for determining the next token in a text sequence with a generative-discriminating language modeling, according to some embodiments.

FIG. 3 is a simplified diagram of a method for determining a next word in the sequence, according to some embodiments. One or more of the processes 302-304 of method 300 may be implemented, at least in part, in the form of executable code stored on non-transitory, tangible, machine-readable media that when run by one or more processors may cause the one or more processors to perform one or more of the processes 302-314.

At process 302, a text sequence is received. For example, class conditional LM 132 and unconditional LM 130 may receive a text sequence. The text sequence may be a sentence for which GeDi modeling may generate a next token $x_t$.

At process 304, a class conditional probability is determined using a positive control code. For example, GeDi module 135 may use a positive control code to determine a class conditional probability $P_\theta(x_t|x_{<t}, c)$ for each token candidate for the next token. In some embodiments, GeDi module 135 may compute a logarithm of the class conditional probability $P_\theta(x_t|x_{<t}, c)$.

At process 306, a class conditional probability is determined using a negative control code. For example, GeDi module 135 may use a negative control code to determine a class conditional probability $P_\theta(x_t|x_{<t}, \bar{c})$ for each token candidate for the next token. In some embodiments, GeDi module 135 may compute a logarithm of the class conditional probability $P_\theta(x_t|x_{<t}, \bar{c})$. In some embodiments, processes 304 and 306 may be performed in parallel.

At process 308, a logarithmic difference between the class conditional probability $P_\theta(x_t|x_{<t}, c)$ and the class conditional probability $P_\theta(x_t|x_{<t}, \bar{c})$ is determined for teach token candidate. The logarithmic difference $\Delta \log P_\theta(x_t|x_{<t}, c)$ may remove a sentimental bias from the class conditional probabilities that may bias the next token $x_t$ toward a particular token candidate. The logarithmic difference $\Delta \log P_\theta(x_t|x_{<t}, c)$ may guide the unconditional LM 130 to predict the next token.

At process 310, an unconditional probability is determined using the unconditional language model. For example, unconditional LM 130 may determine the unconditional probability $P_{LM}(x_t|x_{<t})$ for each token candidate for the next token 170.

At process 312, the next token is determined. For example, the logarithmic difference $\Delta \log P_\theta(x_t|x_{<t}, c)$ may guide the unconditional probability or the logarithm of the unconditional probability toward a token in token candidates that may be selected as the next token 170. As discussed above, the next token 170 may be determined using the weight posterior or filtering heuristics.

Going back to FIG. 1, the embodiments above describe how GeDi module 135 uses class conditional LM 132 discriminately as a generative classifier to guide generation of the next token $x_t$ by unconditional LM 130. While this approach efficiently generates $x_t$, training the class conditional LM 132 as a classifier may improve the accuracy of GeDi module 135 for contrastive generation.

In some embodiment, GeDi training module 140 may train class conditional LM 132 as a discriminative classifier. A trained class conditional LM 132 that correctly classifies sequences using Equation 5 may be better at generating sequences in a desired class. This is because GeDi training module 140 trains class conditional LM 132 to generate samples that belong more strongly in one class than in other classes.

In some embodiments, GeDi training module 140 may train class conditional LM 132 by combining the normal generative language modeling loss $\mathcal{L}_g$ (discussed above in Equation 3) with a discriminative loss $\mathcal{L}_d$. The discriminative loss $\mathcal{L}_d$ may be defined as:

$$\mathcal{L}_d = -\frac{1}{N}\sum_{i=1}^{N} \log P_\theta(c^{(i)} | x_{1:T_i}^{(i)}) \qquad \text{Equation 9}$$

where $P_\theta(c^{(i)}|x_{1:T_i}^{(i)})$ may be derived from a modified version of Equation 5 and may be defined as:

$$P_\theta(c^{(i)} | x_{1:T_i}^{(i)}) = \frac{b_c P_\theta(x_{1:T_i}^{(i)} | c^{(i)})^{\alpha/T_i}}{\sum_{c'} b_{c'} P_\theta(x_{1:T_i}^{(i)} | c')^{\alpha/T_i}} \qquad \text{Equation 10}$$

where $c \in \{c^{(i)}|\bar{c}^{(i)}\}$ for the binary case $c^{(i)}$ is a correct class and $\bar{c}^{(i)}$ is an incorrect class for the $i^{th}$ sequence, $b_c$ is a learnable class bias, $a$ is a learnable scale parameter, and class probability $P_\theta(c^{(i)}|x_{1:T_i}^{(i)})$ is Equation 2. During training, GeDi training module 140 may compute Equation 10 for full training sequences, and not only for the next token 170 as does GeDi module 135 when generating the next token 170. In some embodiments, the log probability for each class may be computed as follows:

$$\log P_\theta(x_{1:T}|c) = \sum_{t=1}^{T} \log P_\theta(x_t|x_{<t}, c) \qquad \text{Equation 11}$$

The log probability may then be used to determine the class probability as follows:

$$P_\theta(c | x_{1:T}) = \frac{e^{(b_c + \alpha/T)\log P_\theta(x_{1:T}|c)}}{\sum_{c'} e^{(b_{c'} + (\alpha/T)\log P_\theta(x_{1:T}|c'))}} \qquad \text{Equation 12}$$

In some embodiments, the cost function $\mathcal{L}_{gd}$ for training the class conditional LM 132 may then be defined as:

$$\mathcal{L}_{gd} = \lambda \mathcal{L}_g + (1-\lambda)\mathcal{L}_d \qquad \text{Equation 13}$$

where $\lambda$ is a weighting hyperparameter. The discriminative loss $\mathcal{L}_d$ increases classification accuracy and label fidelity of samples. The generative loss $\mathcal{L}_g$ preserves the fluency of samples and may help the class conditional LM 132 to have better calibrated conditional log-probabilities for guided generation.

In some embodiments, both GeDi contrastive generation and GeDi training may use a class conditional LM 132 to perform classification. One way to extend GeDi contrastive generation and GeDi training to many classes is to have one forward pass that conditions LM 132 on each control code, and using a softmax over class conditional log probabilities from each control code. Another way to extend GeDi contrastive generation and GeDi training to many classes is to reframe each classification task as binary classification using primary and secondary control codes. The primary control code may have "true" or "false" codes, whereas the secondary control code may be of any class. Class conditional LM then classifies whether the secondary control code corresponds to the text. For instance, the class conditional LM 132 may process the following two sequences in parallel:

<|true|> <|science|>T-rex achieved its massive size due to an enormous growth spurt during its adolescent years.
    <|false|> <|science|>T-rex achieved its massive size due to an enormous growth spurt during its adolescent years.

And use Equation 5 to classify the sequence above as "true" or "false" as to whether the control code, which is in this case is "science", matches the category of the text. During training on training set 150, class conditional LM 132 may process an equal number of true pairings and randomly chosen false pairings. After class conditional LM 132 has been trained, binary GeDi contrastive generation can be applied, using c=<|true|> and $\bar{c}$=<|false|>, and using the desired topic control code as the first token $x_1$ in the sequence.

FIG. 4 illustrates a diagram of results of the GeDi module 135 and a conventional generative language model ability to generate contradictions that contain the answers to a question given in the conditioning text. The results for the GeDi module 135 are computed using class conditional LM 132 that is trained with the cost function that uses different weighting hyperparameters $\lambda$. As illustrated in FIG. 4, the GeDi module 135 has a larger label fidelity than the generative language model for different hyperparameters $\lambda$.

Some examples of computing devices, such as computing device 100 may include non-transitory, tangible, machine readable media that include executable code that when run by one or more processors (e.g., processor 110) may cause the one or more processors to perform the processes of methods 300. Some common forms of machine readable media that may include the processes of methods 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for predicting a next token in a text sequence, comprising:
    determining, using a class conditional language model and a positive control code, a first class conditional probability for each token candidate in a plurality of token candidates;
    determining, using the class conditional language model and a negative control code, a second class conditional probability for the each token candidate in the plurality of token candidates;
    determining, for each token candidate, a logarithmic probability difference between the first class conditional probability and the second class conditional probability;
    determining, using an unconditional language model, unconditional probability for each token candidate in the plurality of token candidates;
    determining, for each token candidate, a combined probability by combining the logarithmic probability difference and the unconditional probability; and
    selecting the next token in the text sequence based on the combined probability.

2. The method of claim 1, further comprising:
    determining, using the class conditional language model, the first class conditional probability in parallel with determining the second class conditional probability.

3. The method of claim 1, wherein the first class conditional probability for each token candidate in the plurality of token candidates is determined by making a forward pass through the class conditional language model.

4. The method of claim 1, wherein the second class conditional probability for each token candidate in the plurality of token candidates is determined by making a forward pass through the class conditional language model.

5. The method of claim 1, wherein the selecting further comprises:
    for each token candidate in the plurality of token candidates determining a weighted posterior probability by:
        weighing a combined probability of a token candidate; and
        multiplying an unconditional probability of the token candidate by the weighted combined probability into the weighted posterior probability;
    normalizing weighted posterior probabilities for the plurality of token candidates; and selecting the next token from the plurality of token candidates as a token candidate with a highest normalized posterior probability.

6. The method of claim 1, further comprising:
for each token candidate in the plurality of token candidates:
dividing a combined probability of a token candidate by a length of the text sequence; and
multiplying an unconditional probability of the token candidate by the divided combined probability; and
selecting the next token from the plurality of token candidates as a token candidate with a highest unconditional probability multiplied by the divided combined probability.

7. The method of claim 1, wherein the selecting further comprises:
determining a first set of tokens candidates from the plurality of token candidates, the first set of token candidates having corresponding class conditional probabilities that maximize a cumulative class conditional probability;
determining a second set of tokens candidates from the plurality of token candidates, each token candidate in the second set of token candidates having a class conditional probability greater than a preconfigured threshold;
determining a final set of tokens candidates by combining the first set of tokens candidates and the second set of tokens candidates; and
selecting the next token from the final set of token candidates.

8. The method of claim 1, further comprising:
training the class conditional language model to account for a discriminative language modeling loss and for generative language modeling loss.

9. A system for predicting a next token in a text sequence, comprising:
a memory;
a processor coupled to the memory and configured to:
determine, using a class conditional language model and a positive control code, a first class conditional probability for each token candidate in a plurality of token candidates;
determine, using the class conditional language model and a negative control code, a second class conditional probability for the each token candidate in the plurality of token candidates;
determine, for each token candidate, a logarithmic probability difference between the first class conditional probability and the second class conditional probability;
determine, using an unconditional language model, unconditional probability for each token candidate in the plurality of token candidates;
determine, for each token candidate, a combined probability by combining the logarithmic probability difference and the unconditional probability; and
select the next token in the text sequence based on the combined probability.

10. The system of claim 9, wherein the processor is further configured to:
determine, using the class conditional language model, the first class conditional probability in parallel with determining the second class conditional probability.

11. The system of claim 9, wherein the first class conditional probability for each token candidate in the plurality of token candidates is determined by making a forward pass through the class conditional language model.

12. The system of claim 9, wherein the second class conditional probability for each token candidate in the plurality of token candidates is determined by making a forward pass through the class conditional language model.

13. The system of claim 9, wherein to select the processor is further configured to:
for each token candidate in the plurality of token candidates determine a weighted posterior probability by:
weigh a combined probability of a token candidate; and
multiply an unconditional probability of the token candidate by the weighted combined probability; and
select the next token from the plurality of token candidates as a token candidate with a highest posterior probability.

14. The system of claim 9, wherein the processor is further configured to:
for each token candidate in the plurality of token candidates:
divide a combined probability of a token candidate by a length of the text sequence; and
multiply an unconditional probability of the token candidate by the divided combined probability; and
select the next token from the plurality of token candidates as a token candidate with a highest unconditional probability multiplied by the divided combined probability.

15. The system of claim 9, wherein to select the processor is further configured to:
determine a first set of tokens candidates from the plurality of token candidates, the first set of token candidates having corresponding class conditional probabilities that maximize a cumulative class conditional probability;
determine a second set of tokens candidates from the plurality of token candidates, each token candidate in the second set of token candidates having a class conditional probability greater than a preconfigured threshold;
determine a final set of tokens candidates by combining the first set of tokens candidates and the second set of tokens candidates; and
select the next token from the final set of token candidates.

16. The system of claim 9, wherein the processor is further configured to:
train the class conditional language model to account for a discriminative language modeling loss and for generative language modeling loss.

17. A non-transitory machine-readable medium having stored thereon machine-readable instructions executable to cause a machine to perform operations for determining a next token in a text sequence, the operations comprising:
determining, using a class conditional language model and a positive control code, a first class conditional probability for each token candidate in a plurality of token candidates;
determining, using the class conditional language model and a negative control code, a second class conditional probability for the each token candidate in the plurality of token candidates;
determining, for each token candidate, a logarithmic probability difference between the first class conditional probability and the second class conditional probability;

determining, using an unconditional language model, unconditional probability for each token candidate in the plurality of token candidates;

determining, for each token candidate, a combined probability by combining the logarithmic probability difference and the unconditional probability; and selecting the next token in the text sequence based on the combined probability.

18. The non-transitory machine-readable medium of claim 17, wherein the selecting further comprises operations comprising:

for each token candidate in the plurality of token candidates determining a weighted posterior probability by:
weighing a combined probability of a token candidate; and multiplying an unconditional probability of the token candidate by the weighted combined probability; and selecting the next token from the plurality of token candidates as a token candidate with a highest posterior probability.

19. The non-transitory machine-readable medium of claim 17, wherein the selecting further comprises operations comprising:

determining a first set of tokens candidates from the plurality of token candidates, the first set of token candidates having corresponding class conditional probabilities that maximize a cumulative class conditional probability;

determining a second set of tokens candidates from the plurality of token candidates, each token candidate in the second set of token candidates having a class conditional probability greater than a preconfigured threshold;

determining a final set of tokens candidates by combining the first set of tokens candidates and the second set of tokens candidates; and selecting the next token from the final set of token candidates.

20. The non-transitory machine-readable medium of claim 17, further comprising:

determine the first class conditional probability in parallel with determining the second class conditional probability by making a first forward pass through the class conditional language model to determine the first class conditional probability and a second forward pass through the class conditional language mode to determine the second class conditional probability.

* * * * *